(12) United States Patent
Northfield

(10) Patent No.: US 8,309,477 B2
(45) Date of Patent: Nov. 13, 2012

(54) LAMINATE STRUCTURE WITH AN INTERLAYER

(75) Inventor: Quinten J. Northfield, Bromley (GB)

(73) Assignee: Rolls-Royce PLC, London (GB)

( * ) Notice: Subject to any disclaimer, the term of this patent is extended or adjusted under 35 U.S.C. 154(b) by 1097 days.

(21) Appl. No.: 12/222,581

(22) Filed: Aug. 12, 2008

(65) Prior Publication Data

US 2009/0047853 A1  Feb. 19, 2009

(30) Foreign Application Priority Data

Aug. 16, 2007  (GB) .................... 0715969.2

(51) Int. Cl.
*D03D 15/00*  (2006.01)
(52) U.S. Cl. ........................ 442/228; 442/181
(58) Field of Classification Search .......... None
See application file for complete search history.

(56) References Cited

U.S. PATENT DOCUMENTS

| | | | |
|---|---|---|---|
| 3,873,409 A | 3/1975 | Jehier | |
| 3,996,082 A | 12/1976 | Leatherman | |
| 4,262,051 A | 4/1981 | Welz et al. | |
| 5,489,073 A * | 2/1996 | Leffel et al. | 244/134 R |
| 5,951,254 A * | 9/1999 | Sikorski et al. | 416/224 |
| 6,521,331 B1 * | 2/2003 | Sikorski et al. | 428/292.1 |
| 6,532,658 B2 * | 3/2003 | Schreiber | 29/889.71 |

FOREIGN PATENT DOCUMENTS

| | | |
|---|---|---|
| EP | 0 284 714 A2 | 10/1988 |
| NL | 7007030 | 11/1971 |

* cited by examiner

*Primary Examiner* — Camie Thompson
(74) *Attorney, Agent, or Firm* — Oliff & Berridge, PLC

(57) ABSTRACT

A laminate structure comprising at least a first layer joined to a second layer by an intermediate layer. The material of the first layer is different to the material of the second layer, and the intermediate layer is composed of fibers of interwoven different first and second materials. An adhesive is provided between the intermediate layer and at least one of the first layer and second layer.

14 Claims, 5 Drawing Sheets

LAMINATE STRUCTURE WITH AN INTERLAYER

FIELD OF THE INVENTION

The present invention relates to a laminate structure. In particular the invention is concerned with a laminate structure having a first layer joined to a second layer by an intermediate layer, the material of the first layer being different to the material of the second layer.

BACKGROUND OF THE INVENTION

It is well known to produce laminated structures by joining sheets of similar or dissimilar materials together. The layers may be joined by any one of a large number of methods. In order to maximise the strength of the structure the layers are bonded together over substantially over all of the surface areas which are in contact. This can be achieved using an adhesive, a thermal bond or compression moulding technique. However, in some cases there is no satisfactory bonding method available to join the materials. This may be because the chemical compositions of the materials are such that they are incompatible with the same adhesives. For example, an adhesive may provide a good bond to one material, but bond weakly or not at all to a different material.

This problem is normally overcome by choosing materials which can be bonded successfully to one another. However, such combinations may result in the finished component having non optimal structural or functional characteristics. For example, it is known to manufacture aerodynamic vanes for turbo machinery from composite materials such as glass fibre or carbon fibre. Such vanes are advantageously lightweight and rigid.

However, they are also brittle, can be easily weakened by impact from foreign objects and vulnerable to erosion. It is common to provide a shield on the leading edge of such aerofoils in the form of a metal strip. Unfortunately, in the eventuality of the strip being released from the vane, there is a high risk of it causing damage to components downstream of the vane.

It would therefore be advantageous to shield the composite material using a material which has high impact resistance but which is less likely to cause damage if it becomes detached, such as, for example, a thermoplastic. However, glass and carbon fibre materials are not easily bonded to thermoplastics, so despite such a material combination in a laminated structure being advantageous for impact and erosion protection, it is not achievable without risking detachment of the protective layer, thereby removing the advantage of such a material selection.

Hence a laminate structure in which a bond can be made between dissimilar materials is highly desirable.

SUMMARY OF THE INVENTION

According to a first aspect of the present invention there is provided a laminate structure comprising at least a first layer joined to a second layer by an intermediate layer, the material of the first layer being different to the material of the second layer, and the intermediate layer is composed of fibres of interwoven different first and second materials characterised in that an adhesive is provided between the intermediate layer and at least one of the first layer and second layer. The first and second layers may be provided as thin or thick sheets, plates, or some combination sheet and plate. Alternatively, one of the layers may be provided as a shaped substrate which the other layer is applied to. The first and second layers may be flexible or rigid. The intermediate layer may take the form of a woven fabric to which a coating may be applied to one side, or different coatings may be applied to either side, where the coating applied to one side of the intermediate layer is capable of adhering to the material(s) of the intermediate layer and one of the first or second layers.

Preferably a first surface of the intermediate layer predominantly comprises fibres of the first material, a second surface of the intermediate layer predominantly comprises fibres of the second material, and the first surface is bonded to the first layer and the second surface is bonded to the second layer. That is to say, the intermediate layer is preferably composed of the same materials which the first and second layers are manufactured from. It is woven such that on one side it presents a surface for contact with the first layer which may be made from the same material as the first layer, and on its other side it presents a surface for contact with the second layer which may be made from the same material as the second layer. Alternatively the fibres of the first material are made from a material which is different to the material of the first layer but which is compatible with the first layer (ie is capable of joining to the first layer) and/or the fibres of the second material are made from a material which is different to the material of the second layer but which is compatible with the second layer (ie is capable of joining to the second layer).

Preferably a first adhesive is provided between the first layer and the intermediate layer and a second adhesive is provided between the intermediate layer and the second layer, the first adhesive being capable of being adhered to the first layer, the second adhesive being capable of being adhered to the second layer. That is to say, the first adhesive is chemically compatible with the material of the first layer and will provide a bond suitable to the intended application of the laminate structure, and the second adhesive is similarly compatible with the material of the second layer.

Alternatively the first layer is thermally bonded to the intermediate layer, and an adhesive is provided between the second layer and the intermediate layer. That is to say, in an alternative embodiment, the bond between one of the layers and the intermediate layer can be achieved by the application of heat and pressure, bringing their contact surfaces to a molten state, thereby forming a weld joint.

Preferably the fibres of the first material is the same as the first layer material. That is to say, the fibres of the first material have substantially the same composition as the material of the first layer.

Alternatively the fibres of the first material are impregnated with the same material as the first layer material. That is to say, the fibres of the first material act as a matrix holding material substantially the same as that of the first layer. This being the case, the material of the fibres can be different material to that of first layer. Hence the fibres of the first material may be made of the same material as the second layer. The fibres of the first material may be impregnated with the same material as the first layer material such that only part of the circumference of the fibres are impregnated, where the impregnated side of the fibres is the side which is bonded to the first layer.

Preferably the fibres of the second material are the same material as the second layer. That is to say, the fibres of the second material have the substantially the same composition as the material of the second layer.

Preferably the second material is chosen from a list of materials including glass fibre and carbon fibre.

Preferably the first material comprises a metal or metallic alloy which may be chosen from a list of materials including copper, aluminium or lead.

Alternatively the first material comprises a thermoplastic, which may include a polyetheretherketone (PEEK).

Preferably the structure is an aerofoil for a gas turbine engine. That is to say, the laminate structure forms a part of whole of an aerofoil, where the aerofoil may be a stator or rotor vane for a fan or compressor assembly.

Preferably the second layer forms the shape of the aerofoil and the first layer is provided at the leading edge of the aerofoil. That is to say, the second layer forms a shaped substrate upon which the first layer is applied as a protective shield.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
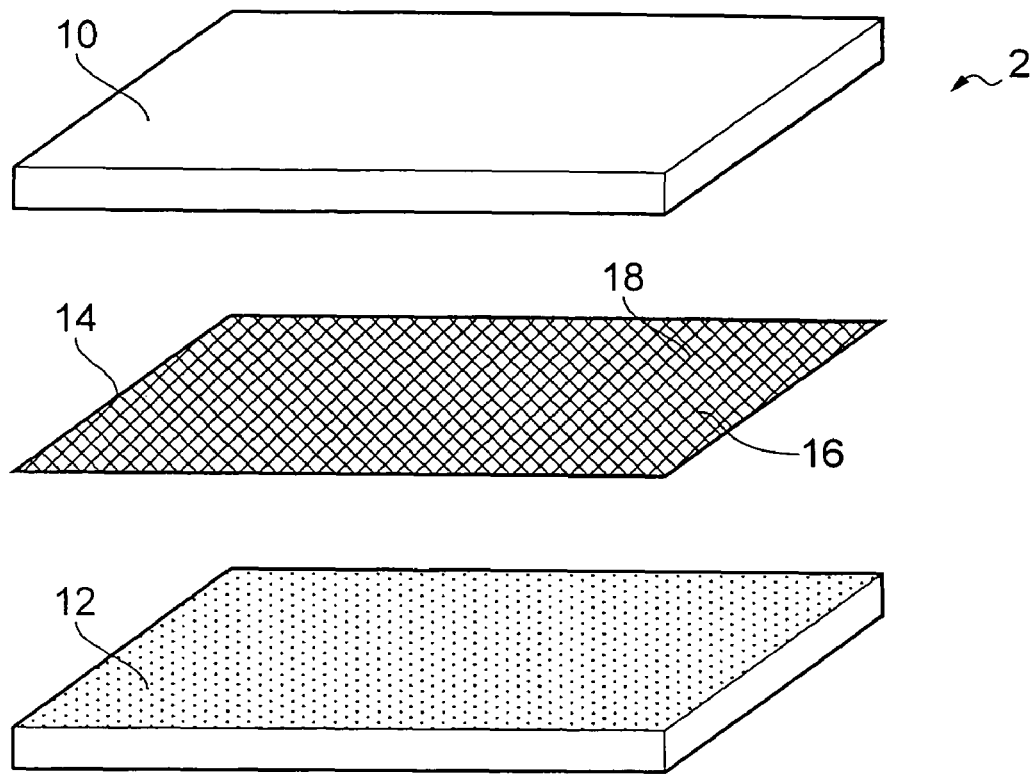
FIG. 1 is an exploded perspective view of one embodiment of the present invention which shows the first layer, second layer and intermediate layer.
Figure 2:
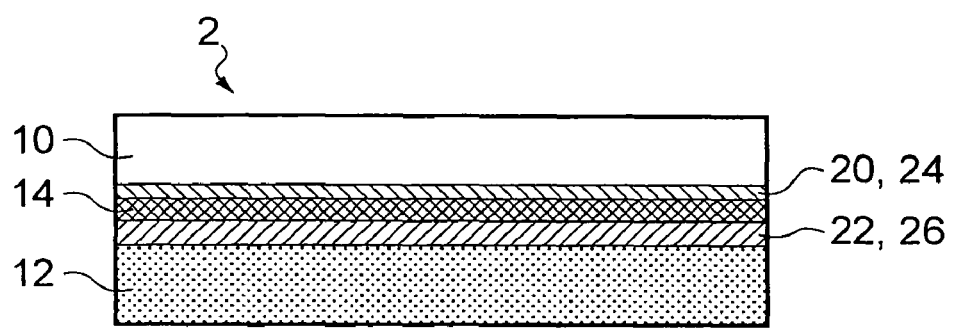
FIG. 2 is a sectional view of the laminated structure of FIG. 1, shown in an assembled state.

FIG. 1 is a perspective view of one embodiment of the present invention in which a laminate structure 2 comprises a first layer 10 and a second layer 12 and an intermediate layer 14. In FIG. 1 the layers 10, 12, 14 are shown in an exploded view for clarity, although when bonded to form a laminated structure, they are sandwiched together such that the first layer 10 and second layer 12 are in contact with opposite sides of the intermediate layer 14, as shown in FIG. 2. The material of the first layer 10 is different to the material of the second layer 12. That is to say the materials of the first layer 10 and second layer 12 are of substantially different composition. The intermediate layer 14 is composed of fibres of a first material 16 interwoven with fibres of a different second material 18.

As shown in FIG. 2, a first adhesive 20 is provided between the first layer 10 and the intermediate layer 14 and a second adhesive 22 is provided between the intermediate layer 14 and the second layer 12. The adhesives 20,22 are applied as a paste or a film, and may be provided on the first and second layers 10,12 and/or the intermediate layer 14 prior to bonding and assembly of the laminate structure 2. The first adhesive 20 is chemically suited to the material of the first layer 10, and the second adhesive 22 is chemically suited to the material of the second layer 12 such that an appropriate bond between the first and second layers 10,12 and intermediate layer 14 is achieved. Likewise, the fibres of first material 16 are compatible with the first adhesive 20, and the fibres of the second material 18 are compatible with the second adhesive 22.

Alternatively the first layer 10 and second layer 12 are thermally bonded and/or compression moulded to the intermediate layer 14 by the application of heat and/or pressure, bringing their contact surfaces to a molten state, thereby forming a weld joint 24,26 between the fibres and their respective layers. In this way, the first material fibres 16 and second material fibres 18 are capable of being bonded with the materials of the first layer 10 and second layer 12 respectively.

In another alternative embodiment, a bond may be achieved by thermally and/or compression bonding the first layer 10 the intermediate layer 14 (eg forming a weld joint 24 between the first layer 10 and the intermediate layer 14) and bonding the second layer 12 to the intermediate layer 14 with an adhesive 22.

Figure 3:
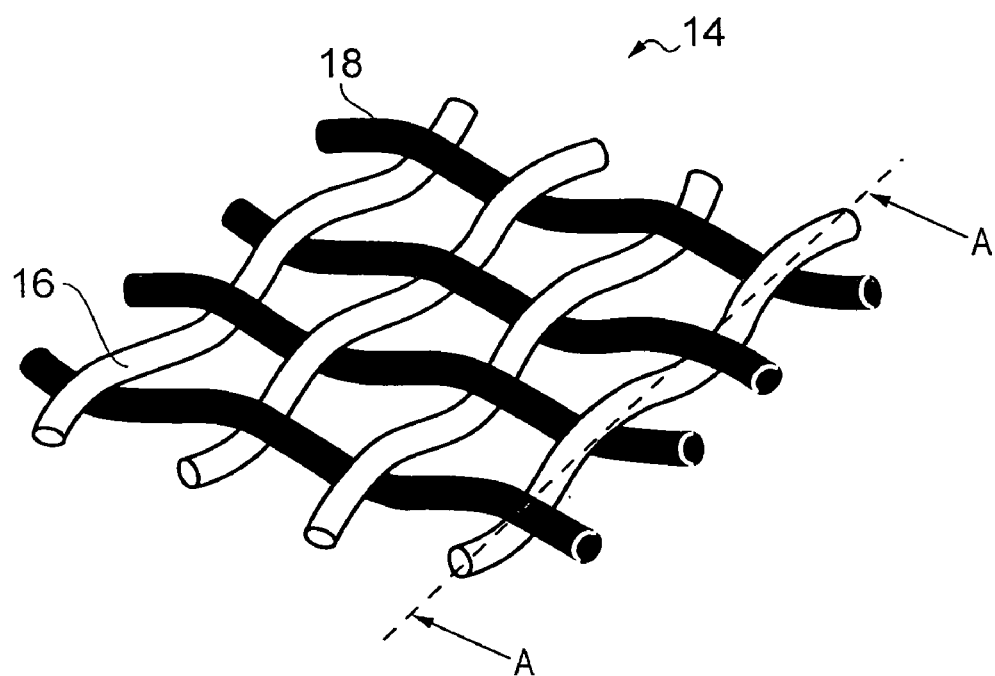
FIG. 3 is an enlarged view of a region of the intermediate layer of FIG. 1 and FIG. 2.
Figure 4:
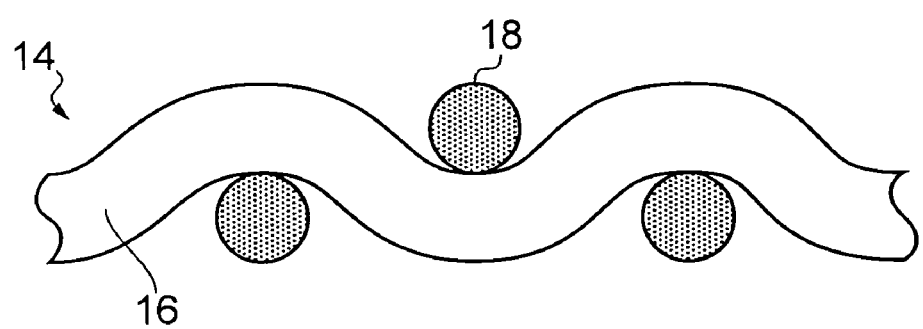
FIG. 4 is a cross sectional view of the intermediate layer, as seen along line A-A in FIG. 3.
Figure 5:
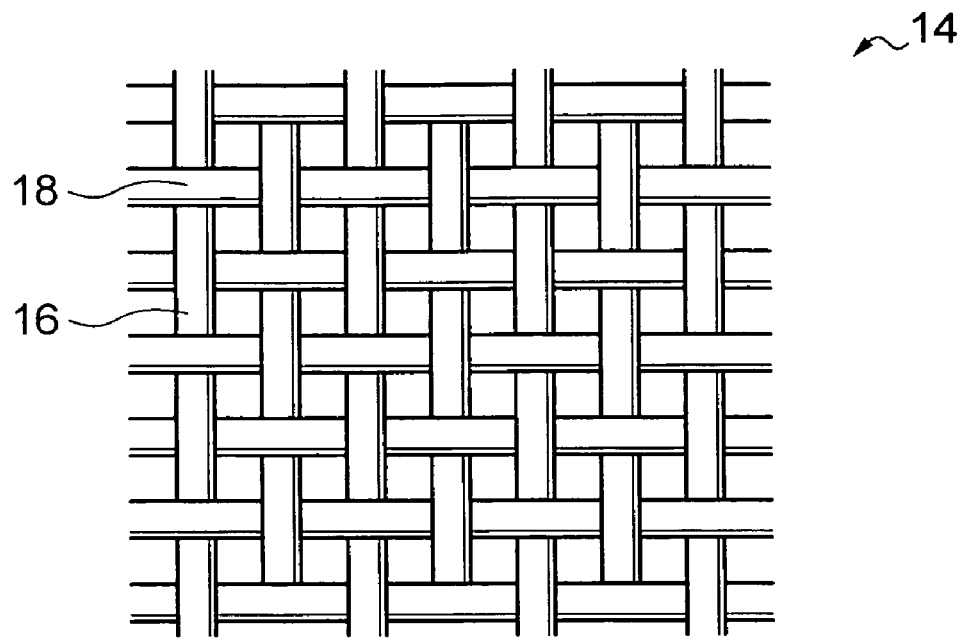
FIG. 5 is a plan view of a region of the intermediate layer of FIG. 1 and FIG. 2.

As shown in FIGS. 3 to 7 the intermediate layer 14 is woven such that the material of the fibres 16,18 is exposed at least on one side of the layer 14. In the embodiment shown in FIG. 3 the external surface of the fibres 16,18 are exposed equally on both sides of the intermediate layer 14, such that the contact surface on each side comprises both first and second fibre materials 16,18. FIG. 4 shows a sectional view of the weave along line A-A as shown in FIG. 3. A plan view of the weave of FIG. 3 is presented in FIG. 5.

Figure 6:
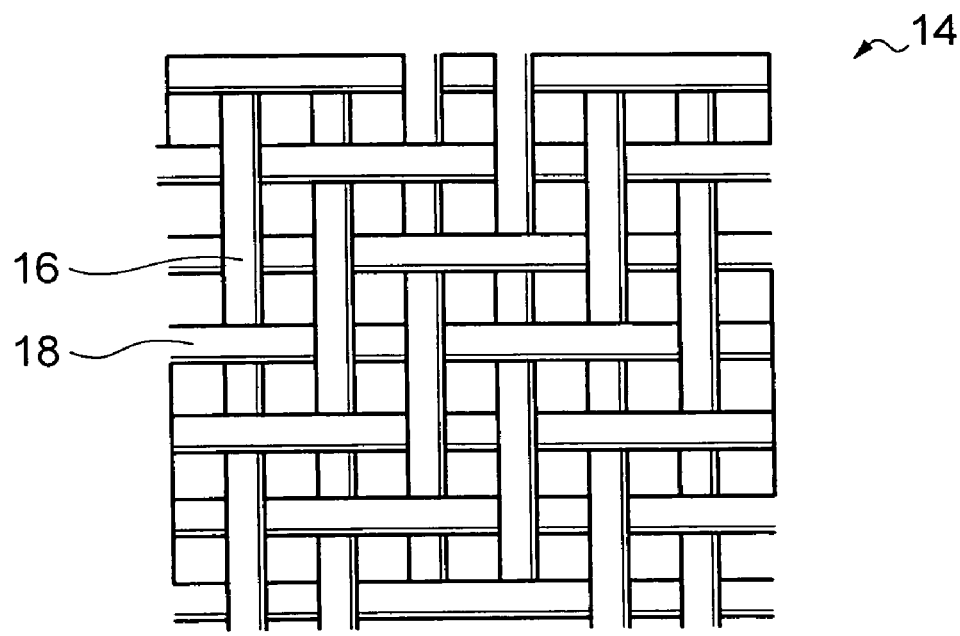
FIG. 6 is plan view of an a region of an alternative embodiment of the intermediate layer of FIG. 1 and FIG. 2.

An alternative embodiment is shown in FIG. 6 in which the fibres 16,18 are woven such that each side of the intermediate layer is provided as a pattern comprising alternately relatively long and short lengths of both fibres 16,18. In this way larger areas are presented for adhesion than in the embodiment presented in FIG. 5.

In an alternative embodiment, the fibres 16,18 are woven such that one side (ie a first surface) of the intermediate layer predominantly comprises fibres of the first material 16, and the opposite side (ie a second surface) predominantly comprises fibres of the second material 18.

Figure 7:
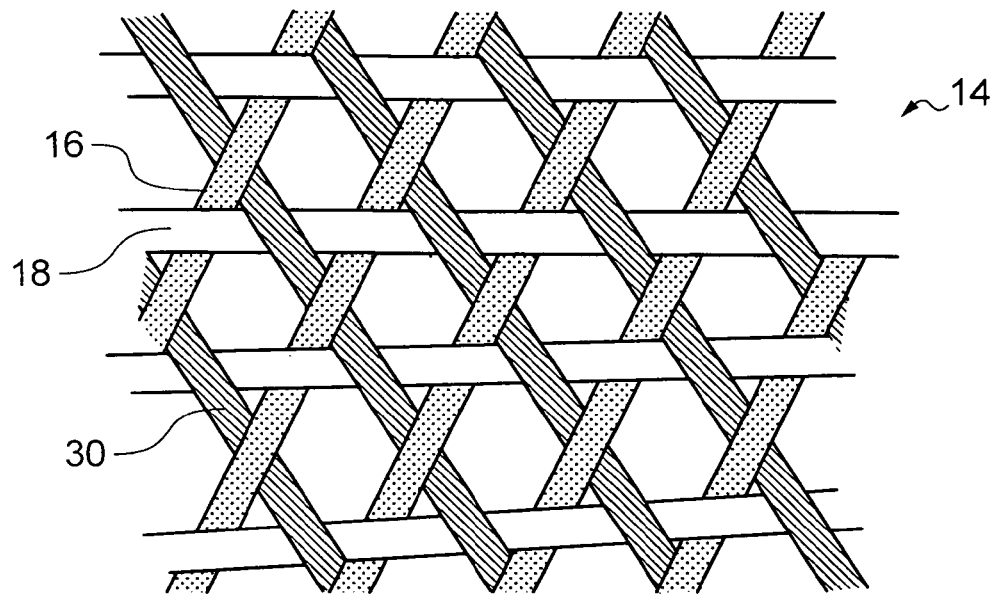
FIG. 7 is plan view of an a region of an further alternative embodiment of the intermediate layer of FIG. 1 and FIG. 2.

A further alternative embodiment is shown in FIG. 7 in which a third fibre 30 is forms part of the weave along with fibres 16,18. The third fibre 30 is made of a material which is either of a neutral composition, or is capable of being bonded to the first or second layers 10,12. Alternatively the fibres of the third material 30 comprises an Elastomer provided at an angle to the other fibres 16,18, thereby increasing the vibration damping capability of the completed laminated structure 2.

In all cases the fibres are woven together such that they mechanically interlock. The adhesive bond 20 or thermal and/or compression bond 24 employed to join the first layer 10 to the intermediate layer 14 does not bond the first layer 10 to the second layer 12.

Neither does the adhesive bond 22 or thermal bond 26 employed to join the second layer 12 to the intermediate layer 14 bond the second layer 12 to the first layer 10. It is only the mechanical interlock of the fibres 16,18 or fibre 16,18,30 which secures the first layer 10 to the second layer 12.

The fibres of the first material 16 may be the same as the material of the first layer 10. Alternatively the fibres of the first material 16 are the same material as the second layer 12, and the fibres of the first material 16 are impregnated with the same material as the first layer material 10. In either embodiment this ensures that the fibres 16 are materially compatible with the material of the first layer 10 and hence are capable of being adhered to the first layer 10 with the first adhesive 20. Alternatively, where the fibres 16 are to be thermally and/or compression bonded to the first layer 10, then this choice of materials ensures that a weld 26 of suitable quality can be achieved.

Similarly the fibres of the second material 18 are the same material as the second layer 12, which thus ensures material compatibility between the fibres 18 and second layer 12 such that a bond 22,26 of suitable quality can be achieved.

The fibres of the first layer material 16 may be impregnated with the same material as the first layer material 10 such that only part of the circumference of the fibres 16 are impregnated, where the impregnated side of the fibres 16 is the side which is bonded to the first layer 10. Thus the side of the intermediate layer 14 which is bonded to the second layer 12 is substantially free of the material of the first layer 10. This will improve the bond between the intermediate layer 14 and the second layer 12 since it will be free of the material of the first layer 10.

The second material may be chosen from a list of materials including glass fibre and/or carbon fibre.

The first material is, or in part comprises, a thermoplastic, for example polyetheretherketone (PEEK). Alternatively the first material is, or in part comprises, a metal or metallic alloy, which may be chosen from a list of materials including copper, aluminium or lead.

Figure 8:
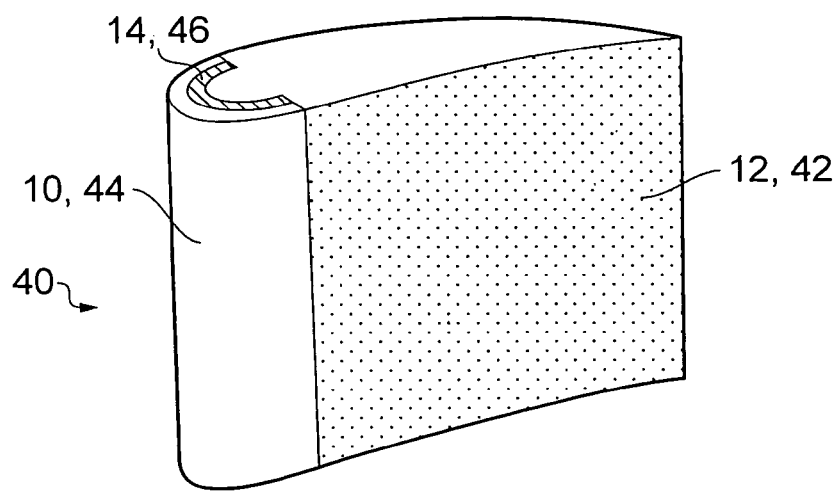
FIG. 8 is a perspective view of an aerofoil made of a one material with a protective layer of a different material bonded to the leading edge with an intermediate layer according to the present invention.

FIG. 8 shows an aerofoil 40 for a gas turbine engine (not shown) which incorporates the present invention. The aerofoil 40 comprises a main body 42 (the second layer 12) and protective layer 44 (the first layer 10) on the leading edge. The main body 42 is made from a different material to that of the protective layer 44. In one embodiment the main body 42 is made from glass fibre and the protective layer is made from PEEK. An intermediate layer 46 comprising glass fibres impregnated with PEEK interwoven with non-impregnated glass fibres is disposed between the protective layer 44 and the main body 42. An adhesive bonds the glass fibre main body 42 to the glass fibres of the intermediate layer 46. The PEEK protective layer 44 is thermally and compression bonded to the PEEK impregnated fibres of the intermediate layer 46. Thus the mechanical interlock between the fibres of the intermediate layer secures the main body 42 (second layer 12) to the protective layer 44 (first layer 10).

In embodiments where the intermediate layer 46 is bonded to the protective layer 44 and/or the main body 42, the protective layer can be removed by the application of heat, and a replacement protective layer 44 can be installed in its place. This is advantageous where the protective layer has been damaged in service, and removes the need for replacing the entire aerofoil 42.

The aerofoil 42 may be a stator or rotor vane for a fan or compressor assembly. Alternatively the aerofoil 42 forms part or all of a wing or intake duct of an aircraft. The PEEK protective layer has a minimum thickness of 0.3 mm.

Figure 9:
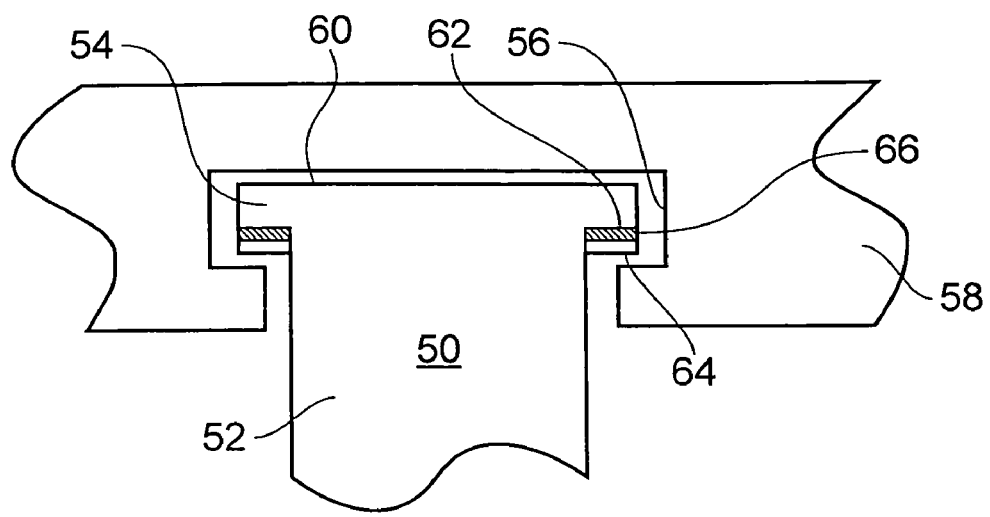
FIG. 9 is a cross sectional view of a mounting arrangement for a composite vane in a metal casing, with a protective coating joined to the vane root by an intermediate layer according to the present invention.

FIG. 9 shows an alternative embodiment of the present invention. A vane 50 has an aerofoil portion 52 and a root portion 54, which, in this example, has a "T" shaped cross section. The root 54 engages with a groove 56 formed in a casing 58. The casing 58 is made from a metallic alloy and the vane 50 is made from a glass fibre composed of glass fibres held in a resin. For clarity the root 54 is shown spaced apart from the casing 58, but in practice will contact the housing on casing on its radially outer surface 60 and/or its radially inner surface 62. Since the metallic alloy of the casing 58 is much harder than the resin of the glass fibre composite vane 50, any region of the vane 50 which comes into contact with the casing 58 will wear. The radially inner surface 62, that is to say, the underside of the flats of the "T" part of the root, has a relatively small contact area, and may also be subject to high vibrational loads and thus is at risk from high wear. A PEEK protective layer 64 is provided on the radially inner surface 62. An intermediate layer 66 is provided between the radially inner surface 62 and the protective layer 64. The intermediate layer 66 is formed from either glass fibres interwoven with PEEK fibres, or glass fibres impregnated with PEEK interwoven with non-impregnated glass fibres. The intermediate layer 66 is joined to the surface 62 by an adhesive. The PEEK protective layer 64 is thermally and compression bonded to the intermediate layer 66. A PEEK protective layer may additionally, or alternatively, be bonded on the radially outer surface 60 (not shown) by the same method. The vane 50, intermediate layer 66 and PEEK protective layer 64 thus comprise a laminate structure according the present invention, where the mechanical interlock between the fibres of the intermediate layer secures the protective layer 64 to the root 54.

Figure 10:
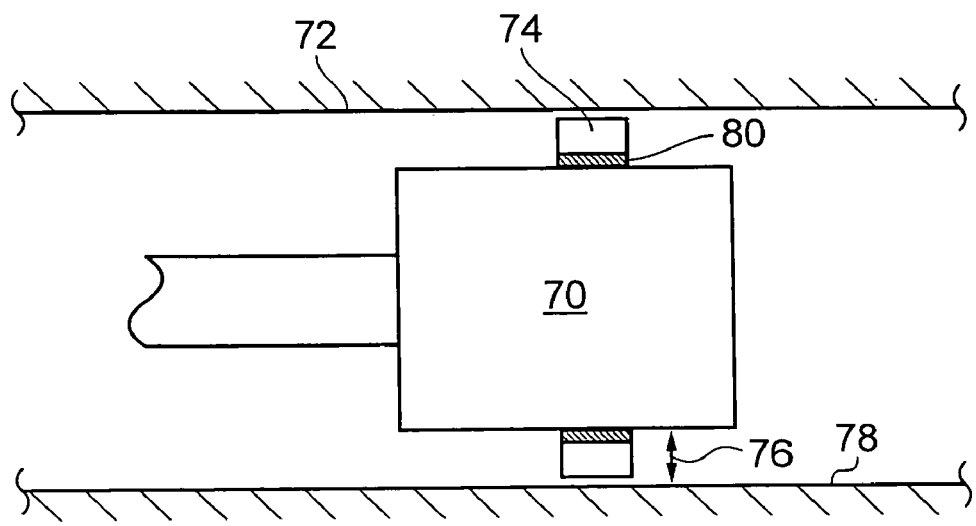
FIG. 10 is a cross sectional view of a piston in a cylinder having a sealing ring made from a dissimilar material joined to the piston by an intermediate layer according to the present invention.

FIG. 10 shows a further alternative embodiment of the present invention. A piston 70 is slideably engaged with, and encased within, a cylinder/tube 72. The piston 70 and cylinder/tube 72 is made from a metallic alloy. A sealing ring 74 is provided on the piston 70 to seal a clearance 76 between the piston 70 and an inner surface 78 of the cylinder 72. For clarity the sealing ring 74 is shown spaced apart from the inner surface 78, but in practice the sealing ring 74 will be in sliding contact with the inner surface 78. The inner surface 78 of the cylinder may optionally be provided with a low friction coating. The ring 74 is made from PEEK, and is bonded to the metallic piston 70 by use of an intermediate layer 80. The intermediate layer 80 is formed from either glass fibres interwoven with PEEK fibres, or glass fibres impregnated with PEEK interwoven with non-impregnated glass fibres. The intermediate layer 80 is joined to the piston 70 by an adhesive. The PEEK sealing ring 74 is thermally and compression bonded to the intermediate layer 80. The piston 70, intermediate layer 80 and PEEK sealing ring 74 thus comprise a laminate structure according the present invention, where the mechanical interlock between the fibres of the intermediate layer secures the sealing ring 74 to the piston 70.

The invention claimed is:

1. A laminate structure comprising:
   a first layer;
   a second layer, wherein the material of the first layer is different to the material of the second layer;
   an intermediate layer that joins the first layer to the second layer, wherein the intermediate layer is composed of fibres of interwoven different first and second materials, wherein
      a first surface of the intermediate layer predominantly comprises fibres of the first material, a second surface of the intermediate layer predominantly comprises fibres of the second material, the first surface is bonded to the first layer and the second surface is bonded to the second layer; and
   a separate adhesive provided between the intermediate layer and at least one of the first layer and second layer.

2. The laminate structure as claimed in claim 1 wherein the adhesive includes a first adhesive and a second adhesive, the first adhesive is provided between the first layer and the intermediate layer and the second adhesive is provided between the intermediate layer and the second layer, the first adhesive being capable of being adhered to the first layer, and the second adhesive being capable of being adhered to the second layer.

3. The laminate structure as claimed in claim 1 wherein the first layer is thermally bonded to the intermediate layer, and the adhesive is provided between the second layer and the intermediate layer.

4. The laminate structure as claimed in claim 1 wherein the fibres of the first material of the intermediate layer is the same as the first layer material.

5. The laminate structure as claimed in claim 1 wherein the fibres of the first material of the intermediate layer are impregnated with the same material as the first layer material.

6. The laminate structure as claimed in claim 5 wherein the fibres of the first material of the intermediate layer are the same material as the second layer material.

7. The laminate structure as claimed in claim 1 wherein the fibres of the second material of the intermediate layer are the same material as the second layer material.

8. The laminate structure as claimed in claim 1 wherein the second material is chosen from a list of materials including glass fibre or carbon fibre.

9. The laminate structure as claimed in claim 1 wherein the first material comprises a metal or metallic alloy.

10. The laminate structure as claimed in claim 9 wherein the first material comprises a metal or metallic alloy chosen from a list of materials including copper, aluminum or lead.

11. The laminate structure as claimed in claim 1 wherein the first material comprises a thermoplastic.

12. The laminate structure as claimed in claim 11 wherein the first material comprises polyetheretherketone (PEEK).

13. The laminate structure as claimed in claim 1 wherein the structure is an aerofoil for a gas turbine engine.

14. The laminate structure as claimed in claim 13 wherein the second layer forms a shape of the aerofoil and the first layer is provided at a leading edge of the aerofoil.

* * * * *